UNITED STATES PATENT OFFICE.

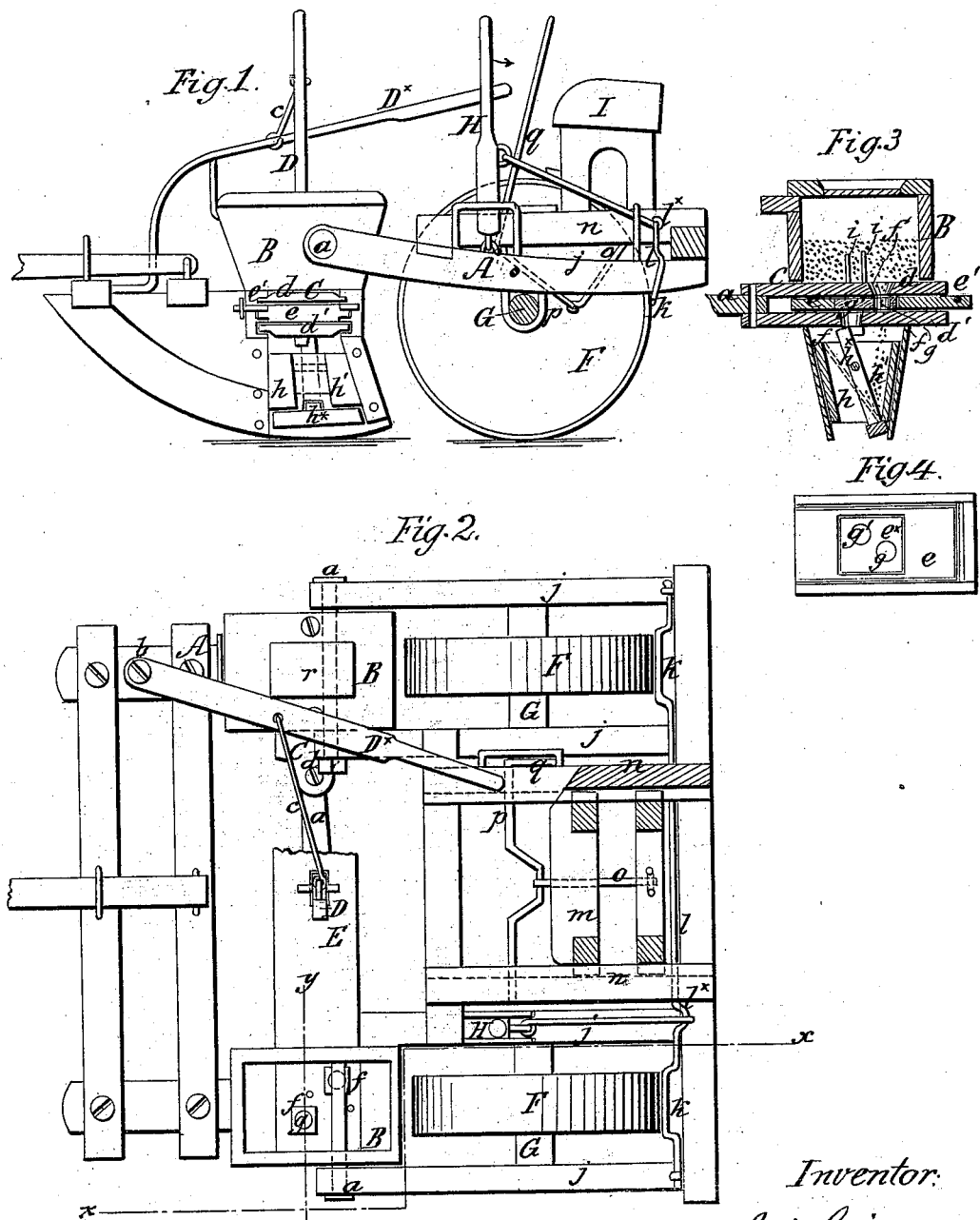

I. N. SMITH, OF GALVA, ILLINOIS.

IMPROVEMENT IN CORN-PLANTERS.

Specification forming part of Letters Patent No. 46,398, dated February 14, 1865.

*To all whom it may concern:*

Be it known that I, I. N. SMITH, of Galva, in the county of Henry and State of Illinois, have invented a new and Improved Corn-Planter; and I do hereby declare that the following is a full, clear, and exact description of the same, reference being had to the accompanying drawings, forming a part of this specification, in which—

Figure 1 represents a longitudinal vertical section of my invention, the line $x\,x$, Fig. 2, indicating the plane of section. Fig. 2 is a plan or top view of the same. Fig. 3 is a detached transverse section of one of the hopper-boxes, the plane of section being indicated by the line $y\,y$, Fig. 2. Fig. 4 is a detached plan or top view of one of the seed-slides.

Similar letters of reference in the several views indicate corresponding parts.

This invention relates to an improvement in that class of corn-planters which open their own furrows by means of runners, and in which the depth of the furrows is regulated by the position of the driver's seat, which can be adjusted backward or forward.

The nature of this invention and its peculiar advantages will be readily understood from the following description.

A represents a frame, made of wood or any other suitable material, and hinged together by means of pivots $a$, so that the rear portion can follow the inequalities of the ground without throwing the runners out of the ground.

The front part of the frame supports the two hopper-boxes B, one on either side, and from these hopper-boxes the seed is discharged by the action of the slides C, which are connected by the link $a$, and to which a reciprocating motion is imparted by means of the hand-lever D or D*, as may be desired. The lever D passes through a mortise in the board F, which connects the two hopper-boxes and serves as a seat for the dropper, in the ordinary manner. The lever D* has its fulcrum on a pivot, $b$, and it extends back in convenient reach from the driver's seat. This lever connects with the lever D by means of a short rod, $c$, and by its aid the seed-slides can be conveniently operated from the driver's seat, and the dropper can be entirely dispensed with. The seed-slides C are composed of two parts, $d\,d'$, which work one above and the other below the stationary plate $e$. The parts $d\,d'$ are perforated with holes $f$, which alternately register with the seed-cells $g\,g'$ in a movable piece, $e^*$, inserted in the plate $e$. The piece $e^*$ forms the gage for the seed, and by taking out the plate $e$ and changing the gage $e^*$ the planter can be readily adjusted for seeds of different kinds. The plate $e$ is secured by a catch, $e'$, which can be readily fastened or unfastened whenever it is desirable to change the gage-plate $e^*$. The operation of the seed-slides can be observed from the outside through windows $r$ in the covers of the hopper-boxes. After passing the seed-slide the seed is deposited in the twin tube $h\,h'$, the two sections of which are separated from each other by a vertical partition, and which are alternately closed by an oscillating valve, $h^*$, to which motion is imparted by the seed-slide. This valve retains the seed in one of the sections of the twin tube until by the return-stroke of said slide the valve is changed, and as the twin tubes extend down in the rear ends of the runner close to the ground the seed drops at the precise spot where it is wanted. The discharge of the seed from the hopper-boxes is facilitated by double stirrers $i$, which are firmly inserted in the upper surfaces of the slides, and passing through the seed prevents it from clogging.

The rear part of the frame A is supported by two wheels, F, which run on axles G, between the longitudinal bars $j$ of the frame. These wheels are provided with broad faces, and they run just behind the runners and seed-tubes, so that the seed discharged from the hoppers is covered by their action. The faces of these wheels are kept clear by scrapers $k$, which are attached to a shaft, $l$, extending across the rear end of the frame A. This shaft is provided with a crank, $l^*$, which connects by a rod, $l'$, with the hand-lever H, so that by forcing said lever in the direction of the arrow marked near it in Fig. 1 the scrapers are forced up against the faces of the wheels, and any dirt or impurities adhering to them is effectually removed.

I is the driver's seat, which is supported by a carriage, $m$, sliding backward and forward between the longitudinal bars $n$ on the rear part of the frame A. Said carriage connects by a rod, $o$, with a crank-shaft, $p$, in front of the driver's seat, and a hand-lever, $g$, secured to the end of this crank-shaft, serves to impart an oscillating motion to the same, and by these means the seat can be moved backward or forward, as the driver may desire, and the driver is thus enabled to throw his weight backward or forward without leaving his seat, and thereby partially counterbalance the weight of the forward part of the machine and affect the depth of the furrow.

What I claim as new, and desire to secure by Letters Patent, is—

Attaching the frame carrying the furrowing device and seed-boxes to the forward end of the pivoted frame A, so that by the forward or rear movement of the driver's seat, by means of the lever $g$, crank-shaft $p$, and carriage $m$, the weight of the driver may be made to partially counterbalance the weight of the forward frame and modify the depth of the furrow.

I. N. SMITH.

Witnesses:
DANIEL KLINE,
JOSHUA UPDYKE.